United States Patent
Asbe et al.

(10) Patent No.: US 9,342,688 B2
(45) Date of Patent: May 17, 2016

(54) APPARATUS AND METHOD FOR INHERITING A NON-SECURE THREAD CONTEXT

(71) Applicant: QUALCOMM Incorporated, San Diego, CA (US)

(72) Inventors: Samar Asbe, San Diego, CA (US); Tero M. Kukola, San Diego, CA (US); Paul Richard Ellis, San Diego, CA (US); Qazi Y. Bashir, San Marcos, CA (US); Suresh Bollapragada, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/789,472

(22) Filed: Mar. 7, 2013

(65) Prior Publication Data

US 2014/0259101 A1    Sep. 11, 2014

(51) Int. Cl.
| | |
|---|---|
| G06F 7/04 | (2006.01) |
| G06F 21/53 | (2013.01) |
| H04W 12/08 | (2009.01) |
| H04W 88/02 | (2009.01) |

(52) U.S. Cl.
CPC ............... *G06F 21/53* (2013.01); *H04W 12/08* (2013.01); *H04W 88/02* (2013.01)

(58) Field of Classification Search
CPC ...... H04L 63/08; G06F 21/6218; G06F 21/31
USPC ............................................................ 726/2
See application file for complete search history.

(56) References Cited

U.S. PATENT DOCUMENTS

| | | | |
|---|---|---|---|
| 6,330,661 B1 * | 12/2001 | Torii | 712/228 |
| 8,082,589 B2 | 12/2011 | Orino et al. | |
| 2005/0114616 A1 * | 5/2005 | Tune et al. | 711/163 |
| 2007/0204085 A1 | 8/2007 | Orlando et al. | |
| 2009/0320048 A1 * | 12/2009 | Watt et al. | 719/319 |
| 2011/0107426 A1 * | 5/2011 | Yen et al. | 726/26 |
| 2012/0331550 A1 | 12/2012 | Raj et al. | |
| 2013/0031374 A1 | 1/2013 | Thom et al. | |

\* cited by examiner

*Primary Examiner* — Teshome Hailu
(74) *Attorney, Agent, or Firm* — Loza & Loza, LLP

(57) ABSTRACT

Disclosed is a method for inheriting a non-secure thread context. In the method, a first secure monitor call associated with a first non-secure thread of a non-secure environment of a processing system is received. A first secure thread is created, in response to the first secure monitor call, that inherits a first interrupt state of the first non-secure thread.

24 Claims, 3 Drawing Sheets

APPARATUS AND METHOD FOR INHERITING A NON-SECURE THREAD CONTEXT

BACKGROUND

1. Field

The present invention relates generally to a secure thread inheriting a context of a non-secure thread.

2. Background

In the ARMv7 architecture, with security extensions implemented, non-secure environment OS threads invoke secure functionality (e.g. Trustzone™) through secure monitor calls directed to a secure environment. The secure environment creates a context for executing/processing a secure monitor call from the non-secure environment. Generally, the secure environment chooses to setup its execution context independent of the non-secure environment. This independent configuration for a secure thread may conflict with the configuration of a non-secure thread. For example, a separate setting of the interrupt state may exhibit undesirable effects, such as interrupt latency.

There is therefore a need for a technique for preventing undesirable effects caused by a configuration conflict between a non-secure thread and a secure thread.

SUMMARY

An aspect of the present invention may reside in a method for inheriting a non-secure thread context. In the method, a first secure monitor call associated with a first non-secure thread of a non-secure environment of a processing system is received. A first secure thread is created, in response to the first secure monitor call, that inherits a first interrupt state of the first non-secure thread.

In more detailed aspects of the invention, the first interrupt state may comprise enable or disable, and may be inherited using a current program status register. The first secure thread may be in a secure environment of the processing system.

In other more detailed aspects of the invention, a second secure monitor call associated with a second non-secure thread may be received. A second secure thread may be created, in response to the second secure monitor call, that inherits a second interrupt state of the second non-secure thread. Further, a third secure monitor call associated with a third non-secure thread may be received. A third secure thread may be created, in response to the third secure monitor call, that inherits a third interrupt state of the third non-secure thread.

Another aspect of the invention may reside in an apparatus, comprising: means for receiving a first secure monitor call associated with a first non-secure thread of a non-secure environment; and means for creating a first secure thread, in response to the first secure monitor call, that inherits a first interrupt state of the first non-secure thread.

Another aspect of the invention may reside in an apparatus, comprising a processor configured to: receive a first secure monitor call associated with a first non-secure thread of a non-secure environment; and create a first secure thread, in response to the first secure monitor call, that inherits a first interrupt state of the first non-secure thread.

Another aspect of the invention may reside in a computer program product, comprising computer-readable medium, comprising: code for causing a computer to receive a first secure monitor call associated with a first non-secure thread of a non-secure environment; and code for causing a computer to create a first secure thread, in response to the first secure monitor call, that inherits a first interrupt state of the first non-secure thread.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
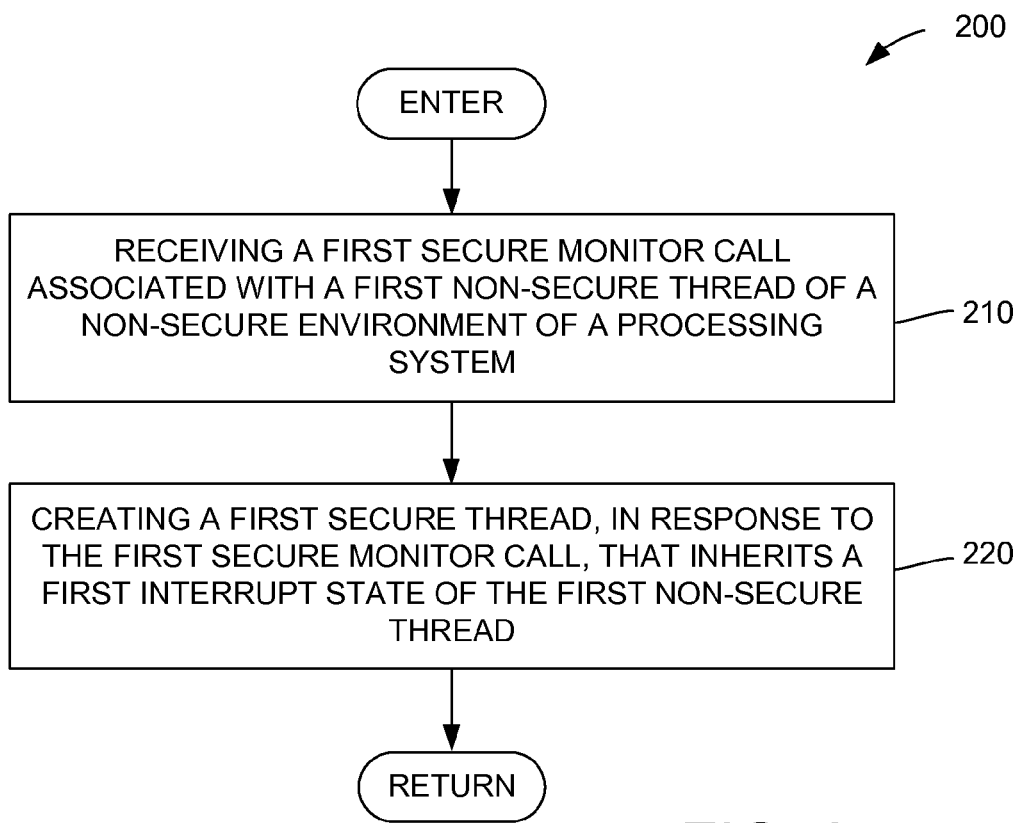
FIG. 2 is a flow diagram of a method for a secure thread inheriting a context of a non-secure thread, according to the present invention.
Figure 3:
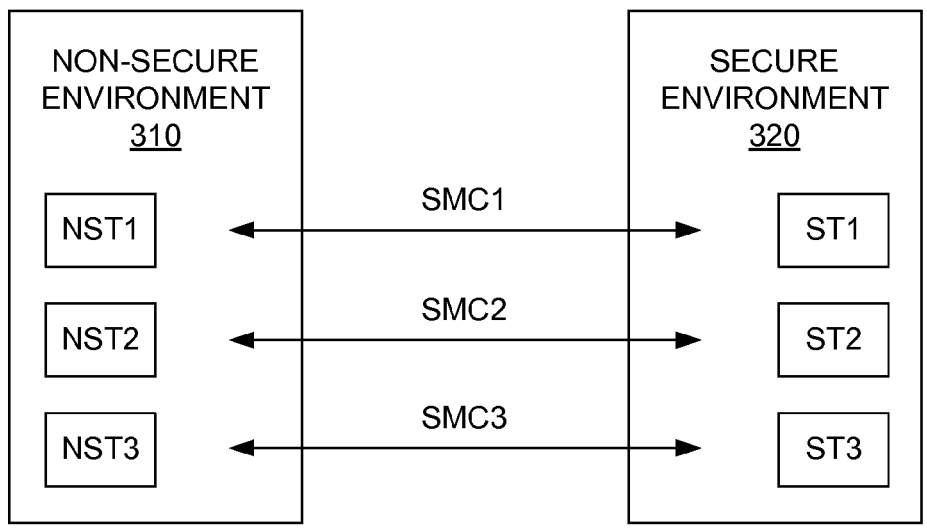
FIG. 3 is a block diagram of a non-secure environment and a secure environment of a processing system.

With reference to FIGS. 2 and 3, an aspect of the present invention may reside in a method 200 for inheriting a non-secure thread context. A secure functionality of a secure execution environment, for example, in the ARMv7 architecture, may be invoked using a secure monitor call. (ARM-based processors are widely used in mobile devices such as smartphones.) In the method, a first secure monitor call SMC1 associated with a first non-secure thread NST1 of a non-secure environment 310 of a processing system is received (step 210). A first secure thread ST1 is created, in response to the first secure monitor call SMC1, that inherits a first interrupt state of the first non-secure thread NST1 (step 220).

Figure 4:
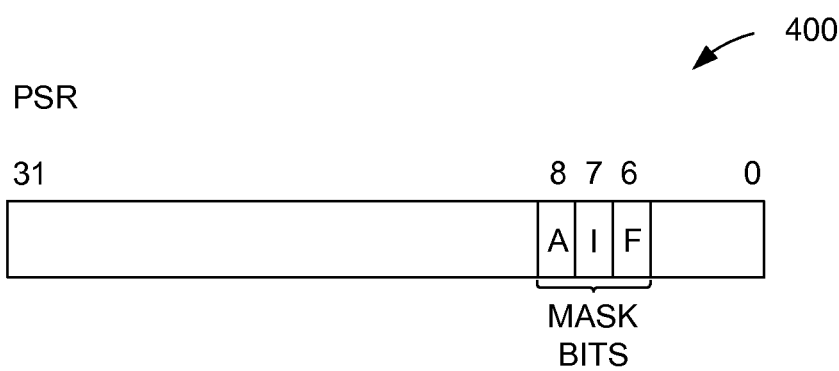
FIG. 4 is a block diagram of a computer including a processor and a memory.

With further reference to FIG. 4, in more detailed aspects of the invention, the first interrupt state may comprise enable or disable, and may be inherited using a current program status register 400. The program status register PSR may be 32 bits. Bit 7 of the PSR may represent the interrupt state.

The inherited interrupt state for a secure thread (e.g., ST1) is the current interrupt state of a corresponding non-secure thread (e.g., NST1) at the time the secure monitor call is made. At a later time, the corresponding non-secure thread (e.g., NST1) may have a change in its interrupt state, and a secure monitor call made after that change would result in the inherited interrupt state being that of the changed (or then current) interrupt state of the non-secure thread at the time the later secure monitor call is made.

In other more detailed aspects of the invention, the first secure thread ST1 may be in a secure environment 320 of the processing system. Also, a second secure monitor call SMC2 associated with a second non-secure thread NST2 may be received. A second secure thread ST2 may be created, in response to the second secure monitor call, that inherits a second interrupt state of the second non-secure thread. Further, a third secure monitor call SMC3 associated with a third non-secure thread NST3 may be received. A third secure thread ST3 may be created, in response to the third secure monitor call, that inherits a third interrupt state of the third non-secure thread.

The inheritance of the interrupt state ensures that the interruptibility of an operation within the secure environment 320 is consistent with the thread interruptibility of the non-secure thread requesting the operation. This inheritance helps the non-secure environment 210 (or world) control the non-secure interrupt latency even when it requests services from the secure environment 220 (or world).

Figure 5:
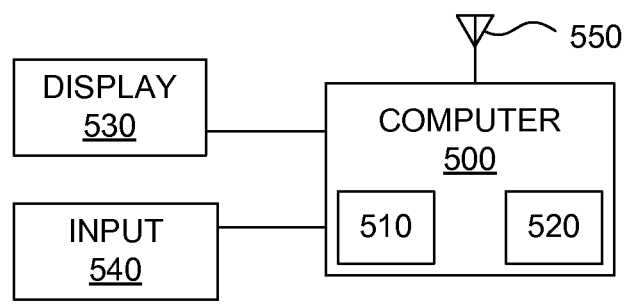
FIG. 5 is a schematic diagram of a program status register.

With further reference to FIG. 5, another aspect of the invention may reside in an apparatus, comprising: means 510 for receiving a first secure monitor call SMC1 associated with a first non-secure thread NST1 of a non-secure environment 310; and means 510 for creating a first secure thread ST1, in response to the first secure monitor call SMC1, that inherits a first interrupt state of the first non-secure thread NST1.

Another aspect of the invention may reside in an apparatus, comprising a processor 510 configured to: receive a first secure monitor call SMC1 associated with a first non-secure thread NST1 of a non-secure environment 310; and create a first secure thread ST1, in response to the first secure monitor call SMC1, that inherits a first interrupt state of the first non-secure thread NST1.

Another aspect of the invention may reside in a computer program product, comprising computer-readable medium 520, comprising: code for causing a computer 500 to receive a first secure monitor call SMC1 associated with a first non-secure thread NST1 of a non-secure environment 310; and code for causing a computer 500 to create a first secure thread ST1, in response to the first secure monitor call SMC1, that inherits a first interrupt state of the first non-secure thread NST1.

Other thread attributes may be inherited, such as thread priority and/or memory mapping, e.g., a mapping of input and/or output buffers shared between the secure environment and the non-secure environment. The inheritance of output buffer memory mapping attributes from the non-secure side may help the secure environment and the non-secure environment leverage the sharing of the cache lines, thereby eliminating the need of performing cache maintenance operation when information is exchanged. Security is not compromised as the information is outbound from the secure environment.

An apparatus or station may comprise a computer 500 that includes a processor 510, a storage medium 520 such as memory and/or a disk drive, a display 530, and an input such as a keypad 540, and a wireless connection 550. The processor and/or the storage medium may comprise the processing system that hosts the non-secure environment 310 and the secure environment 320. The processor may be implemented as a system-on-a-chip (SOC) in accordance with the ARMv7 architecture. An ARM-based processor is a RISC (Reduced Instruction Set Computing) processor. A secure execution environment is available in the ARMv7 architecture, with security extensions implemented.

Figure 1:
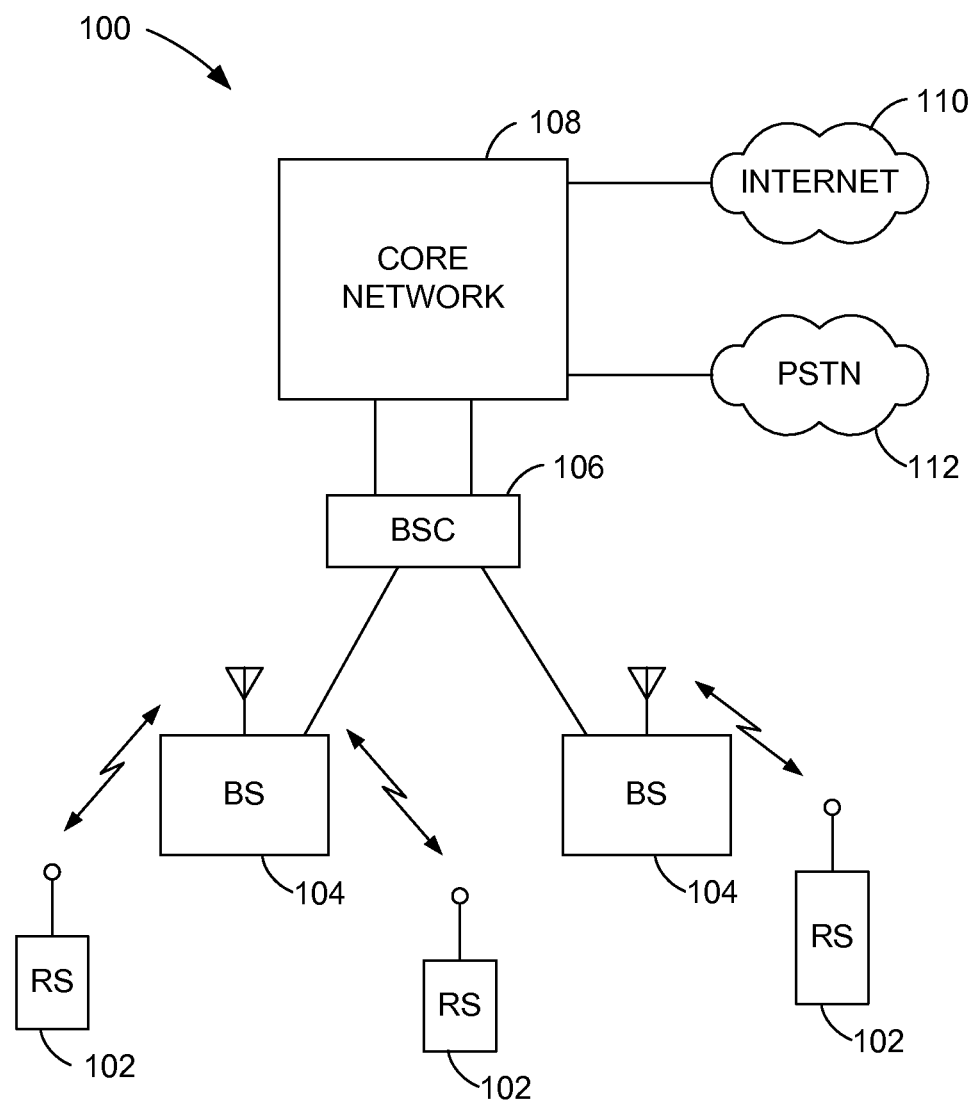
FIG. 1 is a block diagram of an example of a wireless communication system.

With reference to FIG. 1, a wireless remote station (RS) 102 (e.g. a mobile station MS) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method for inheriting a non-secure thread context in a processing system comprising a computing device, the method being performed by the computing device and comprising:
    receiving, at the computing device, a first secure monitor call associated with a first non-secure thread of a non-secure environment of the processing system, the first non-secure thread comprising a first interrupt state that comprises enable or disable; and
    creating, at the computing device, a first secure thread, in response to the first secure monitor call, wherein the first secure thread inherits the first interrupt state of the first non-secure thread by setting a secure interrupt state of the first secure thread to the first interrupt state of the first non-secure thread at the time the first secure monitor call is received.

2. The method for inheriting as defined in claim 1, wherein the first interrupt state is inherited using a current program status register.

3. The method for inheriting as defined in claim 1, wherein the first secure thread is in a secure environment of the processing system.

4. The method for inheriting as defined in claim 1, further comprising:
    receiving a second secure monitor call associated with a second non-secure thread; and
    creating a second secure thread, in response to the second secure monitor call, that inherits a second interrupt state of the second non-secure thread.

5. The method for inheriting as defined in claim 4, further comprising:
    receiving a third secure monitor call associated with a third non-secure thread; and
    creating a third secure thread, in response to the third secure monitor call, that inherits a third interrupt state of the third non-secure thread.

6. The method for inheriting as defined in claim 1, wherein the secure interrupt state is set by copying a bit of a current program status register associated with the first non-secure thread.

7. An apparatus, comprising:
    means for receiving a first secure monitor call associated with a first non-secure thread of a non-secure environment of the apparatus, the first non-secure thread comprising a first interrupt state that comprises enable or disable; and
    means for creating a first secure thread, in response to the first secure monitor call, wherein the first secure thread inherits the first interrupt state of the first non-secure thread by setting a secure interrupt state of the first secure thread to the first interrupt state of the first non-secure thread at the time the first secure monitor call is received.

8. The apparatus as defined in claim 7, wherein the first interrupt state is inherited using a current program status register.

9. The apparatus as defined in claim 7, wherein the first secure thread is in a secure environment.

10. The apparatus as defined in claim 7, further comprising:
    means for receiving a second secure monitor call associated with a second non-secure thread; and
    means for creating a second secure thread, in response to the second secure monitor call, that inherits a second interrupt state of the second non-secure thread.

11. The apparatus as defined in claim 10, further comprising:
    means for receiving a third secure monitor call associated with a third non-secure thread; and
    means for creating a third secure thread, in response to the third secure monitor call, that inherits a third interrupt state of the third non-secure thread.

12. The apparatus as defined in claim 7, wherein the secure interrupt state is set by copying a bit of a current program status register associated with the first non-secure thread.

13. An apparatus, comprising:
    a processor configured to:
        receive a first secure monitor call associated with a first non-secure thread of a non-secure environment of the apparatus, the first non-secure thread comprising a first interrupt state that comprises enable or disable; and
        create a first secure thread, in response to the first secure monitor call, wherein the first secure thread inherits the first interrupt state of the first non-secure thread by setting a secure interrupt state of the first secure thread to the first interrupt state of the first non-secure thread at the time the first secure monitor call is received.

14. The apparatus as defined in claim 13, wherein the first interrupt state is inherited using a current program status register.

15. The apparatus as defined in claim 13, wherein the first secure thread is in a secure environment.

16. The apparatus as defined in claim 13, wherein the processor is further configured to:
    receive a second secure monitor call associated with a second non-secure thread; and
    create a second secure thread, in response to the second secure monitor call, that inherits a second interrupt state of the second non-secure thread.

17. The apparatus as defined in claim 16, wherein the processor is further configured to:
    receive a third secure monitor call associated with a third non-secure thread; and
    create a third secure thread, in response to the third secure monitor call, that inherits a third interrupt state of the third non-secure thread.

18. The apparatus as defined in claim 13, wherein the secure interrupt state is set by copying a bit of a current program status register associated with the first non-secure thread.

19. A non-transitory computer program product, comprising:
- a computer-readable medium, comprising:
    - code for causing a computer to receive a first secure monitor call associated with a first non-secure thread of a non-secure environment of The non-transitory computer program product, the first non-secure thread comprising a first interrupt state that comprises enable or disable; and
    - code for causing a computer to create a first secure thread, in response to the first secure monitor call, wherein the first secure thread inherits the first interrupt state of the first non-secure thread by setting a secure interrupt state of the first secure thread to the first interrupt state of the first non-secure thread at the time the first secure monitor call is received.

20. The non-transitory computer program product as defined in claim 19, wherein the first interrupt state is inherited using a current program status register.

21. The non-transitory computer program product as defined in claim 19, wherein the first secure thread is in a secure environment.

22. The non-transitory computer program product as defined in claim 19, further comprising:
- code for causing a computer to receive a second secure monitor call associated with a second non-secure thread; and
- code for causing a computer to create a second secure thread, in response to the second secure monitor call, that inherits a second interrupt state of the second non-secure thread.

23. The non-transitory computer program product as defined in claim 22, further comprising:
- code for causing a computer to receive a third secure monitor call associated with a third non-secure thread; and
- code for causing a computer to create a third secure thread, in response to the third secure monitor call, that inherits a third interrupt state of the third non-secure thread.

24. The non-transitory computer program product as defined in claim 19, wherein the secure interrupt state is set by copying a bit of a current program status register associated with the first non-secure thread.

\* \* \* \* \*